June 16, 1931. H. H. SEMMES 1,809,913

AIRFOIL

Original Filed Nov. 19, 1929

Inventor
HARRY H. SEMMES

By Semmes & Semmes
Attorneys

Patented June 16, 1931

1,809,913

UNITED STATES PATENT OFFICE

HARRY H. SEMMES, OF CHEVY CHASE, MARYLAND, ASSIGNOR TO BENDIX AVIATION CORPORATION OF NEW YORK, N. Y., A CORPORATION OF DELAWARE

AIRFOIL

Original application filed November 19, 1929, Serial No. 408,375. Divided and this application filed April 12, 1930. Serial No. 443,782.

The invention relates to airplanes and more particularly has reference to an airfoil construction therefor which possesses great strength and rigidity.

This application is a division of an application Serial Number 408,375, filed November 19, 1929.

At present airfoils or airplane wings are constructed so as to support a load of from 12 to 16 times the weight of the airplane itself. Beyond these limits structural weight is added to such an extent that the airplane is impractical and strength must be sacrificed for weight.

It is well known dynamic loads are created by the actuation of the airplane control surfaces and at times these loads may well exceed the structural strength of the wings and cause them to fail. The amount of these dynamic loads are greatly influenced by the time factor within which the control surfaces of an airplane are operated. By arranging the control surfaces so that they may not be actuated quickly excessive strains upon the wings may be prevented. While this has been successfully accomplished, it is evident that the ease and the speed with which an airplane may be maneuvered into various positions is considerably lowered.

It is customary in the present practice to construct an airfoil of a plurality of spars and ribs, the former being positioned at definite and equal distances along the transverse axis or cord of the airfoil, while the latter are positioned at equal distances apart from each other along the longitudinal axis of the airfoil. While such structure has successfully furnished a strength sufficient to support a load, within the limits mentioned above, it may be observed that no attempts have been made to employ a considerable number of spars and ribs possessing relatively small cross sections and positioned in groups at the points or within the zones where the resultant of the load carried by the wing takes effect so as to increase the structural strength while at the same time reducing the weight of the airfoil.

It is also quite customary to form the spars and ribs, employed in an airfoil construction, of a plurality of members usually a beam or girder-like member having a web, and one or more flanges. Generally these members are formed separately and are secured to the web. It is apparent that such construction possesses the inherent defect of requiring an unnecessary multiplicity of parts.

The major object of the invention is the design of an airfoil of light weight which possesses great strength and rigidity.

Another object of the invention is the construction of an airfoil provided with an integral frame.

Another object of the invention is the construction of an airfoil having an integral frame, the longitudinal and transverse members of which are grouped in close proximity to each other at the points or within the zone of the resultant load carried by the airfoil.

Yet another object of the invention is the design of an airfoil having an integral structure which is of fan-like shape.

A further object of the invention is the devising of an airfoil construction employing a plurality of spars arranged in a fan-like shape which are employed in conjunction with ribs arranged at varying distances apart from each other.

Still a further object of the invention is the devising of an airfoil construction comprising an integral frame which may be employed with an airfoil having a longitudinal outline tapered as to thickness, or a tapered planform, or a combination of these two.

Yet a further object of the invention is the devising of an airfoil construction having an integral frame which is of simple design permitting ease of fabrication and of inexpensive construction.

With these and other objects in view, which may be incident to my improvements, the invention consists in the parts and combinations to be hereinafter set forth and claimed, with the understanding that the several necessary elements comprising my invention may be varied in construction, proportions and arrangement without departing from the spirit and scope of the appended claims.

The present invention deals with airplanes and consists in the construction of an airfoil therefor which is an integral structure. One method of practically effecting the concept of this invention is to provide a plurality of spars positioned at varying distances from each other along the transverse axis of the airfoil and a plurality of ribs positioned at varying distances from each other along the longitudinal axis of the airfoil. The invention also comprehends the grouping of these members at the points and within the zone of the resultant of the force or load acting upon the airfoil during flight.

In order to make my invention more clearly understood, I have shown in the accompanying drawings, means for carrying the same into practical effect without limiting the improvements in their useful applications to the particular constructions, which for the purpose of explanation, have been made the subject of illustration.

Figure 1:
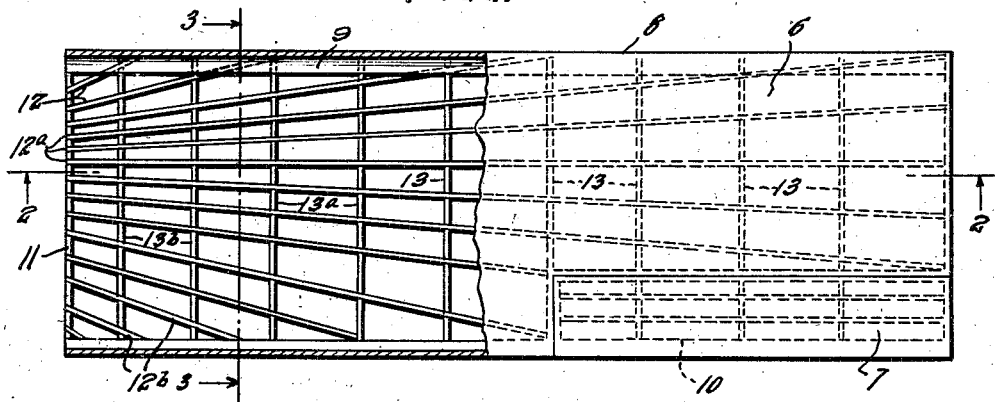
Figure 1 is a plan view of an airfoil, with a part of the wing surfacing material removed, constructed in accordance with my invention.
Figure 2:
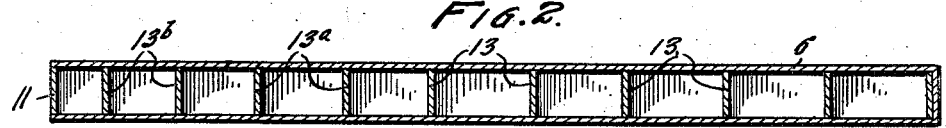
Figure 2 is a cross sectional elevation of the airfoil shown in Figure 1 and is taken along the line 2—2.
Figure 3:
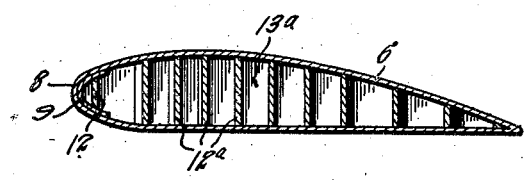
Figure 3 represents a cross sectional elevation taken along the line 3—3 of Figure 1.
Figure 4:
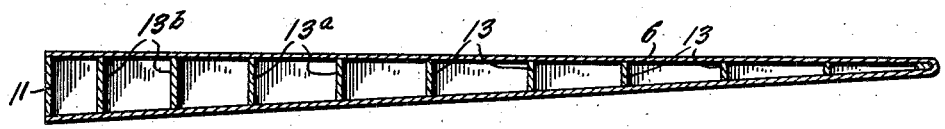
Figure 4 is a view similar to Figure 2 but showing an airfoil having a longitudinal outline tapered as to thickness.
Figure 5:
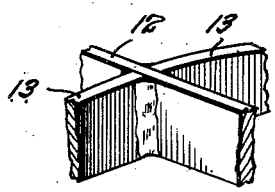
Figure 5 is a pictorial representation showing the manner of securing the ribs to the spars.

Disclosed in Figure 1 is a semi-span of an airplane wing generally designated as 6, having an aileron 7, and surfacing material 8. A spar 9 is shown running substantially the full length of the airfoil and parallel to the leading edge thereof. The spar 9 may be shaped so as to conform to the contour of the airfoil and support the surfacing material adjacent to the leading edge. If desired a spar 10 similar to spar 9 may be positioned upon the trailing edge of the airfoil.

Extending from the inner end base, or root 11 of the semi-span are a plurality of spars 12. It should be noted that the spars 12 extend outwardly from the base or root portion 11 and are of unequal length. Moreover, the spars are so arranged as to form a substantially fan-like structure. The outer ends of the spars are secured to the leading and trailing edges, the tip, and the ribs of the airfoil, while the inner ends of the spars are secured to the root portion 11 of the fan.

Spars 12 are so arranged that their inner ends, which are connected to the base portion 11, are at varying distances from each other. This construction allows the spars to be grouped in close proximity to each other within the zone of center of pressure travel as indicated at 12a. Likewise such construction permits the trailing edge, weakened by the cutout portion for the aileron, to be suitably supported and strengthened by the spars as shown at 12b.

The ribs 13 are spaced along the longitudinal axis of the airfoil so that their distances from each other vary. Such an arrangement allows the ribs 13a, adjacent to the path of the lateral center pressure travel to be grouped in close proximity to each other thus adding strengthening qualities to the airfoil along the lateral position of the resultant lift load. Moreover, a grouping of the ribs may be employed close to the root portion 11 as shown by the ribs 13b. By this structural expedient the semi-span may be adequately supported from the fuselage of an airplane.

While only a semiwing span has been shown in the drawings, it will be well understood that such construction may be equally well employed with airplanes having a continuous wing or wings which passes either over or under the fuselage. In such an event a fan structure similar to that shown in Figure 1 could be placed upon the other or left side of the wing, and would have a common origin with the fan section shown. To accomplish this the spars forming the fan-like structure on the left side of the span could be connected to the base portion 11 or a second base portion could be provided if desired.

The construction shown in Figure 1 is disclosed in connection with a wing having an untapered outline and plan-form and also in connection with a wing having a longitudinal outline tapered as to thickness. It is obvious, however, that the construction just described is equally applicable to an airfoil having a longitudinal outline tapered as to thickness and a tapered plan-form.

The wing disclosed in the drawings has its spars and ribs formed of metallic material having a relatively thin transverse cross section. Also sheet metal surfacing material may be employed with the airfoil. The ribs 13 are formed of a plurality of sections and are welded or otherwise secured between the spars in a manner similar to that described in the parent application above mentioned. Likewise it may be appreciated that this form of the invention may be equally well constructed of wood. In either instance fabric wing surfacing material may be employed if desired.

It is apparent that in the fan-like structure by providing a considerable number of spars and ribs having a thin cross section the advantages of a comparatively light airfoil is obtained. Moreover it is evident that the fan-like construction also provides an integral frame, any member of which upon being stressed will transmit a portion of its load to the other members of the airfoil. Likewise the advantages derived from grouping the spars and the ribs within the zone of travel of the center pressure of the wing will be appreciated inasmuch as the parts of the wing at which the resultant stress occurs will be strongly reinforced.

While I have shown and described a wing having a square tip, it is to be understood that other designs of wing tips, such for example, as a tip having a negative rake and a tip having a positive rake will fall within the scope of the invention. Likewise it is to be understood that the invention comprehends the use of an airfoil section, as for example a section having a flat bottom cord, a double cambered section, a section having its under surface entirely concave, a combination of a concave and a convex section or any combination of these.

It is desirable to have means accessible to the interior of an airfoil so that the ribs and spars may be frequently inspected. In the event that sheet metal surfacing material is employed and this feature is desired in connection with the wing it is obvious that a portion of the upper surfacing material of the airfoil may be formed of sheet metal and the remainder of fabric.

The features of the airfoil construction will be appreciated from the foregoing description. It may be seen that an airfoil having an integral supporting frame formed of a comparatively great number of spars and ribs of thin cross section has been designed. Moreover, by grouping the spars and ribs at points within the zone where the greatest load upon an airfoil occurs, an exceptional strong or rigid construction has been provided. Likewise it is apparent that all the members of the airfoil resist loads or stress upon any particular member and all of the members act as bracing members for each other. Finally it may be seen that an airfoil of simple construction, comparatively small weight, and inexpensive fabrication has been devised.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. An airplane wing construction having a plurality of spars arranged in a fan-like shape, the ends of said spars adjacent the root portion of the fan being positioned at varying distances from each other, the spars within the zone of center of pressure travel of the wing being in close proximity with each other.

2. An airplane wing construction having a plurality of spars arranged in a fan-like shape, the ends of said spars adjacent the root portion of the fan being positioned at varying distances from each other, the spars within the zone of center of pressure travel of the wing and the spars near the trailing edge of the wing being grouped in close proximity to each other.

3. An airfoil construction comprising a plurality of spars arranged in a fan-like shape, the root of said fan being adjacent to a fuselage of an airplane, the ends of said spars adjacent the root portion of the fan being positioned at varying distances from each other, and a plurality of ribs connected to said spars, the ribs being positioned along the longitudinal axis of the airfoil at varying distances from each other.

4. An airfoil construction comprising a plurality of spars arranged in a fan-like shape, the root of said fan being adjacent to a fuselage of an airplane, the ends of said spars adjacent the root portion of the fan being positioned at varying distances from each other, and a plurality of ribs connected to the spars, the ribs being positioned along the longitudinal axis of the airfoil at varying distances from each other, those ribs within the zone of lateral center of pressure travel of the airfoil being grouped in close proximity to each other.

5. An airfoil construction comprising a plurality of spars arranged in a fan-like shape, the root of said fan being adjacent to a fuselage of an airplane, the ends of said spars adjacent the root portion of the fan being positioned at varying distances from each other, the spars within the zone of center of pressure travel along the chord of the airfoil and the spars near the trailing edge of the wing being grouped in close proximity to each other, and a plurality of ribs connected to said spars, said ribs being positioned along the longitudinal axis of the airfoil at varying distances from each other.

6. An airfoil construction comprising a plurality of spars arranged in a fan-like shape, the root of said fan being adjacent to a fuselage of an airplane, the ends of said spars adjacent the root portion of the fan being positioned at varying distances from each other, the spars within the zone of center of pressure travel along the chord of the airfoil and the spars near the trailing edge of the wing being grouped in close proximity to each other, and a plurality of ribs connected to said spars, said ribs being positioned along the longitudinal axis of the airfoil at varying distances from each other, those ribs within the zone of lateral center of pressure travel of the airfoil being grouped in close proximity to each other.

7. An airplane wing construction having a plurality of spars, said spars positioned so as to form a substantially fan-like structure within each semi-span of the wing, said spars originating from a rib member forming a root for the fan and positioned perpendicular to the longitudinal axis of the wing, the ends of said spars adjacent the root being at varying distances from each other, all of said spars extending outwardly towards a wing tip, some of said spars being secured to the leading edge of the wing, other of said spars being secured to the trailing edge of the wing, and still other of said spars being secured to the tip of the wing.

8. An airplane wing construction comprising a plurality of one-piece continuous spars arranged in a fan-like shape, the root of said fan being adjacent a fuselage of an airplane, the ends of said spars adjacent the root portion of the fan being positioned at varying distances from each other, and a plurality of ribs for the wing, each of said ribs being formed of a plurality of sections of material adapted to be secured between two adjacent spars so as to be formed in a continuous line across the wing, said ribs being positioned along the longitudinal axis of the wing at varying distances from each other.

9. An airfoil construction comprising a plurality of spars arranged in a fan-like shape, the root of said fan being adjacent to a fuselage of an airplane, the ends of said spars adjacent the root portion of the fan being positioned at varying distances from each other, with those spars within the zone of center of pressure travel and with those spars near the trailing edge of the airfoil being grouped in close proximity to each other, and a plurality of ribs connected to said spars, the ribs being positioned along the longitudinal axis of the airfoil at varying distances from each other.

In testimony whereof I affix my signature.

HARRY H. SEMMES.